United States Patent Office 3,480,551
Patented Nov. 25, 1969

3,480,551
LUBRICATING COMPOSITION
Frederic C. McCoy, Beacon, and Edwin C. Knowles, Poughkeepsie, N.Y., assignors to Texaco Inc., New York, N.Y., a corporation of Delaware
No Drawing. Filed May 22, 1964, Ser. No. 369,627
Int. Cl. C10m 3/48, 3/26, 3/14
U.S. Cl. 252—42.7                11 Claims The present invention relates to a lubricating composition and, in particular, to mineral oil and synthetic ester base lubricating oils containing a complex or adduct of a hydroxy compound and an inorganic halide or thiocyanate to improve the anti-wear and load carrying properties of the lubricating composition.

New designs and improvements in machinery are continually raising the operating performance standards of lubricating compositions. In many instances, the pressures and temperatures to which the bearing surfaces of machinery operate under are higher than those which natural or synthetic lubricating oils can withstand. Instances where difficult lubricating conditions are encountered occur in the lubrication of heavily loaded pinion and spur gears, gear trains, bearings, extrusion applications and the like. As a result, there is an increasing need for lubricating compositions having improved properties for these services.

A class of lubricating compositions has been discovered which possesses greatly improved properties for a variety of lubricating applications. These compositions are particularly notable for their improvement in anti-wear and load carrying properties but many of them also possess additional valuable features, such as corrosion resistance, oxidation resistance and stability. The novel lubricants provide the answer to some heretofore difficult lubricating problems.

The present lubricating composition comprises a major proportion of a lubricating oil base, such as a mineral lubricating oil or a synthetic lubricating oil, and a minor amount of an oil-soluble adduct formed from a hydroxy compound and an inorganic halide or thiocyanate. More particularly, the additive of this invention is represented by the following formula:

$$(RR'_mOH)_2 \cdot MX_z$$

wherein R is a hydrocarbyl radical having from 12 to 30 carbon atoms, R' is a divalent radical from the group consisting of —OCH$_2$CH$_2$— and —NHCH$_2$CH$_2$—, $m$ is an integer from 0 to 10, M is a polyvalent cation selected from the class consisting of titanium, tin, zinc, copper, zirconium and antimony, X is a halogen selected from the group consisting of chloride, bromide, fluoride and iodide ions or a thiocyanate ion, and $z$ is an integer from 2 to 4 equal to the valence of M. In a preferred aspect of the invention $m$ is 0 or 1.

The adducts of the invention are prepared by mixing two moles of the hydroxy compound defined above with a mole of the inorganic compound from the class set forth. Simple mixing of the reactants will generally produce the reaction. Optionally, the reaction can be effected in the presence of a solvent that will dissolve the inorganic compound. Effective solvents include acetone, methanol and tetrahydrofuran. The reaction is usually exothermic and some provision for cooling the reaction mixture is desirable. It is important to keep the reaction temperature below the decomposition temperature of either of the components of the reaction product. The reaction generally goes to completion in a short reaction time.

Hydroxy compounds which can be employed for preparing the adduct of the invention are those having a large hydrocarbyl component which imparts a high degree of oil solubility to those compounds. More particularly, the hydroxy compounds are represented by the formula:

$$RR'_mOH$$

wherein R is a hydrocarbyl radical having from 12 to 30 carbon atoms, R' is a divalent radical from the group consisting of —OCH$_2$CH$_2$— and —NHCH$_2$CH$_2$—, and $m$ is an interger from 0 to 10 although $m$ is preferably 0 or 1. R may be a straight or branched chain aliphatic radical or an alkaryl radical.

Examples of hydroxy compounds which can be employed to form the adducts of the invention include tridecyl alcohol, dodecyl alcohol, octadecenyl alcohol, hexadecyl alcohol, hexadecenyl alcohol, tetradecenyl alcohol, octylphenoxyethanol, dioctylphenoxyethanol, hexylphenoxyethanol, isobutylphenoxyethanol, tetradecenyliminoethanol, octadecenyliminoethanol and dodecenyliminoethanol. The hydroxy compounds in which $m$ has a value from 1 to 10 can be made by reacting a suitable alcohol alkylphenol or amine with the appropriate number of moles of ethylene oxide.

Inorganic metal salts which form oil-soluble adducts with the above described hydroxy compounds are represented by the formula:

$$MX_z$$

in which M is a polyvalent cation from the group consisting of titanium, tin, zinc, copper, zirconium and antimony while X is a halogen from the group consisting of chloride, bromide, fluoride and iodide ions or a thiocyanate ion and $z$ is an integer from 2 to 4 equal to the valence of M.

Inorganic salts, which form oil-soluble adducts with the above described hydroxy compounds to produce effective anti-wear lubricating oil compositions, include zinc chloride, zinc bromide, zinc iodide, stannous chloride zinc thiocyanate, zirconium chloride, antimony fluoride and titanium tetrafluoride.

In distinction to the foregoing metal salts, complexes could not be formed using aluminum fluoride, zinc phosphite, mercuric chloride, zinc sulfate and zinc silicofluoride.

Examples of adducts of the invention and the mole ratio of the component parts of the adduct are given below:

tridecyl alcohol/zinc chloride 2:1
tridecyl alcohol/zinc bromide 2:1
tridecyl alcohol/zinc thiocyanate 2:1
tridecyl alcohol/stannous chloride 2:1
tridecyl alcohol/titanium tetrafluoride 2:1
tridecyl alcohol/zirconium chloride 2:1
octadecenyl alcohol/zinc chloride 2:1
octadecenyl alcohol/stannous chloride 2:1
Priminox T–1M/zinc chloride 2:1[1].
Priminox T–1M/stannous chloride 2:1
Priminox T–1M/titanium tetrafluoride 2:1
octylphenoxyethanol/zinc chloride 2:1
octylphenoxyethanol/stannous chloride 2:1, and
octylphenoxyethanol/zinc thiocyanate 2:1

The lubricating compositions of the invention are prepared by blending in a conventional way a minor amount of the oil-soluble, load-carrying adduct described hereinabove into a suitable lubricating oil base. Generally, the adduct is employed in an amount in the range of 0.05 to 10 percent by weight based on the weight of the lubricating composition with the preferred proportions being from 0.1 to 3 weight percent.

---

[1] Priminox T–1M is the reaction product of Primene JM–T (a C$_{21}$ t-alkyl primary amine) and one mole of ethylene oxide.

The base lubricating oil can be a mineral lubricating oil or a synthetic lubricating oil. The mineral lubricating weight of the indicated adduct unless otherwise indicated. The results of these tests are given in Table I below.

TABLE I.—ANTI-SCUFF, ANTI-WEAR PROPERTIES IN RYDER GEAR AND MEAN HERTZ LOAD TESTS

| Nature of Adduct | Mole Ratio | Base Oil | Ryder Gear Test, p.p.i. | Mean Hertz Load |
|---|---|---|---|---|
| None | | Plexol 201J | 2,300 | 16 |
| Tridexyl alcohol/titanium tetrafluoride | 2:1 | do | 4,380 | |
| Priminox T-1M/titanium tetrafluoride | 2:1 | do | 3,770 | |
| Priminox T-1M/titanium tetrafluoride 0.1% concentration | 2:1 | do | 3,220 | |
| Octylphenoxyethanol/stannous chloride | 2:1 | do | | 75 | oil can be a predominantly paraffinic or naphthenic or it can be a mixture of both types of mineral oils. Generally, the mineral oil will be a refined oil of predominantly paraffinic nature having a viscosity in the range from 30 to 150 Saybolt Universal seconds at 210° F.

Various types of synthetic lubricating oil bases can be employed in preparing the lubricants of the invention. Aliphatic ester, polyalkylene oxides, silicones and esters of phosphoric and salicyclic acid can be employed. Examples of the aliphatic esters include di-(2-ethylhexyl) sebacate, the dialkyl azelates, dialkyl suberates, and the dialkyl adipates such as di-hexyl azelate, di-(2-ethylhexyl) azelate, di-3,5,5-trimethylhexyl glutarate, di(2-ethylhexyl) adipate, tri-amyl tricarballylate, etc. The polyalkylene oxides include polypropylene oxide, polyisopropylene oxide diether, polyisopropylene oxide diesters, etc. The silicones include methyl silicone, methylphenyl silicone, and the silicates include tetraisooctyl silicate.

Other effective synthetic lubricating oils include the neopentyl glycol esters such as the neopentyl glycol propionates, neopentyl glycol butyrates and neopentyl glycol caprylates and the trimethylol alkanes such as trimethylol ethane, trimethylol propane, trimethylol pentane, trimethylol heptane and trimethylol dodecane and the like. Examples of the phosphate esters include tricresyl phosphate, trioctyl phosphate and tridecyl phosphate as well as mixed aryl and alkyl phosphates.

The anti-scuffing and load carrying ability of a number of the lubricating compositions was determined in the Ryder Gear Test (Federal Test Method 6508). In this test, the lubricant is employed to lubricate two spur gears in a Pratt and Whitney Gear and Lubricating Tester (also called the Ryder Gear Tester). This tester was operated with a gear speed of 10,000 r.p.m. and with an oil inlet temperature of 165° F. A loading pressure of 5.0 p.s.i. was applied during break-in. After ten minutes, the tester was shut down and the gear examined for the percentage of tooth area scuff on each tooth. The procedure was then repeated using high load pressures with increments of 5 p.s.i. until 22.5 percent of the total tooth face area on the driving gear had been scuffed, the load applied in this run being considered the scuff load. The tooth load in pounds per inch of tooth width was then calculated.

The load carrying properties of lubricating compositions of the invention was also determined by the Mean Hertz Load Test. This test is run in a machine having four ½ inch diameter bearing balls which are driven under load while the balls are lubricated by the composition under test as described in U.S. 2,600,058.

The lubricating compositions employed in these tests were prepared from a synthetic lubricating oil known as Plexol 201-J. This lubricating oil is essentially di-2-ethyl sebacate and has an SUS viscosity at 210° F. of about 37. All of the lubricant compositions contained 1 percent by The test results show that the lubricating compositions of the invention have substantially improved anti-scuff, anti-wear properties. The load carrying properties exhibited are particularly valuable in lubricants for gas turbines.

In the following test, the anti-wear properties of the lubricants of the invention were determined in the Navy Four Ball Test. The same synthetic oil described in Example I was employed in this run.

The Navy Four Ball Test is another determination of the anti-wear properties of a lubricant. The test machine comprises a system of four steel balls, 3 of which are in contact with each other in one plane in a fixed, triangular position in a reservoir containing the oil sample and a fourth ball above and in contact with the other three. In carrying out the test, the upper ball is rotated while it is pressed against the lower three at any desired pressure by means of a suitable weight applied to a lever arm, and the diameters of the scars on the three lower balls are measured by the means of a low power microscope. The average diameter, measured in two directions on each of the three lower balls, is taken as a measure of the anti-wear characteristics of the lubricant. The results of the tests are given in Table II below.

TABLE II

Oil composition (wt.)      Navy Four Ball Wear, microns/min.
Base oil _____ 10.2
Base oil+1% tridecyl alcohol/zinc thiocyanate (2:1) _____ 1.8
Base oil+1% octylphenoxyethanol zinc thiocyanate (2:1) _____ 1.6

The lubricating compositions containing the above-described adducts have substantially improved extreme pressure, anti-wear and anti-scuff properties. They also exhibit good corrosion resistance, oxidation resistance and storage stability. These valuable properties make the lubricants of the invention suitable for a broad range of lubricating applications.

It is understood that the lubricating compositions of the invention can contain numerous additives conventionally used to improve the properties of the lubricating oils. Commonly employed additives are the methacrylates as V.I. improvers and pour point depressors, the alkylphenols as oxidation inhibitors, alkaline earth metal salts of petroleum sulfonates or alkaryl sulfonates as detergents, metal dialkyl dithiophosphate corrosion inhibitors and silicone anti-foam fluids.

Obviously, many modifications and variations of the invention as hereinbefore set forth may be made without departing from the spirit and scope thereof and, therefore, only such limitations should be imposed as are indicated in the appended claims.

We claim:
1. A lubricating composition comprising a major proportion of a lubricating oil and 0.05 to 10 percent by weight of an oil-soluble adduct represented by the formula:

$$(RR'_mOH)_2 \cdot MX_z$$

wherein R is a hydrocarbyl radical having from 12 to 30 carbon atoms, R' is a divalent radical selected from the group consisting of $-OCH_2CH_2-$ and $-NHCH_2CH_2$, $m$ is an integer from 0 to 10, M is a polyvalent cation selected from the class consisting of titanium, zinc, copper, zirconium and antimony, X is an anion selected from the group consisting of chloride, bromide, fluoride, iodide and thiocyanate anions and $z$ is an integer from 2 to 4 equal to the valence of M.

2. A lubricating composition according to claim 1 in which $MX_z$ represents titanium tetrafluoride.

3. A lubricating composition according to claim 1 in which $MX_z$ represents zinc thiocyanate.

4. A lubricating composition according to claim 1 containing about 0.10 to 3 percent by weight of said adduct.

5. A lubricating composition according to claim 1 in which said adduct consists of tridecyl alcohol and titanium tetrafluoride in the mole ratio of 2:1 respectively.

6. A lubricating composition according to claim 1 in which said adduct consists of octylphenoxyethanol and stannous chloride in the mole ratio of 2:1 respectively.

7. A lubricating composition according to claim 1 in which said adduct consists of tridecyl alcohol and zinc thiocyanate in the mole ratio of 2:1 respectively.

8. A lubricating composition according to claim 1 in which said adduct consists of octylphenoxyethanol and zinc thiocyanate in the mole ratio of 2:1 respectively.

9. A lubricating composition according to claim 1 in which said lubricating oil is a synthetic lubricating oil.

10. A lubricating composition according to claim 1 in which $m$ is an integer from 0 to 1.

11. A lubricating composition according to claim 1 in which said adduct consists of 2 mols of the reaction product of $C_{21}$ t-alkyl primary amine and ethylene oxide and 1 mol of titanium tetrafluoride.

References Cited

UNITED STATES PATENTS

| | | | |
|---|---|---|---|
| 3,256,188 | 6/1966 | Papayannopoulos | 252—42.7 |
| 2,160,273 | 5/1939 | Loane et al. | 252—46.4 X |
| 2,334,566 | 11/1943 | Lincoln | 252—46.4 X |

DANIEL E. WYMAN, Primary Examiner

C. F. DEES, Assistant Examiner

U.S. Cl. X.R.

252—46.4, 49.7